US012425234B2

(12) United States Patent
Wang et al.

(10) Patent No.: US 12,425,234 B2
(45) Date of Patent: Sep. 23, 2025

(54) METHOD AND SYSTEM FOR VALIDATING SECURITY OF A VEHICLE

(71) Applicant: Continental Automotive Technologies GmbH, Hannover (DE)

(72) Inventors: Yi Wang, Singapore (SG); Vijayaraj Suriyakumar, Singapore (SG)

(73) Assignee: Continental Automotive Technologies GmbH, Hannover (DE)

( * ) Notice: Subject to any disclaimer, the term of this patent is extended or adjusted under 35 U.S.C. 154(b) by 110 days.

(21) Appl. No.: 18/577,855

(22) PCT Filed: Jun. 24, 2022

(86) PCT No.: PCT/EP2022/067390
§ 371 (c)(1),
(2) Date: Jan. 9, 2024

(87) PCT Pub. No.: WO2023/280601
PCT Pub. Date: Jan. 12, 2023

(65) Prior Publication Data
US 2024/0305474 A1 Sep. 12, 2024

(30) Foreign Application Priority Data

Jul. 9, 2021 (GB) ...................................... 2109903

(51) Int. Cl.
*H04L 9/32* (2006.01)
*H04L 9/08* (2006.01)
*H04L 67/12* (2022.01)

(52) U.S. Cl.
CPC .......... *H04L 9/3255* (2013.01); *H04L 9/0825* (2013.01); *H04L 9/085* (2013.01); *H04L 67/12* (2013.01); *H04L 2209/84* (2013.01)

(58) Field of Classification Search
CPC ..... H04L 9/3255; H04L 9/0825; H04L 9/085; H04L 67/12; H04L 2209/84; H04L 9/3247; H04L 63/06; H04L 63/08
See application file for complete search history.

(56) References Cited

U.S. PATENT DOCUMENTS

2015/0033016 A1\* 1/2015 Thornton .............. H04L 9/0869
713/171
2015/0263856 A1\* 9/2015 Leboeuf ................ H04L 9/0866
713/184

(Continued)

FOREIGN PATENT DOCUMENTS

JP          2017079369 A     4/2017

OTHER PUBLICATIONS

Shinji Yamabuchi et al. "Efficient Network Management with Hierarchical Distributed CA", IPSJ SIG Technical Reports, Japan, Information Processing Society of Japan, Feb. 14, 2002, vol. 2002, No. 12.

(Continued)

*Primary Examiner* — Javier O Guzman

(57) ABSTRACT

Cryptography is used to validate the security of a vehicle. An authentication system integrated in a zone master Electronic Control Unit (ECU) of a predefined zone requests pre-allocated signed unique cryptographic key shares from each of multiple primary ECUs associated with the zone master ECU, when there is an authentication requirement. Thereafter, the authentication system computes a first unique signature of the predefined zone using a predefined number of the key shares and verifies the validity of the computed first unique signature using a public key. Finally, the verified first unique signature is provided to a vehicle master ECU associated with the zone master ECU, to enable it to activate safety functionalities associated with the primary ECUs. Thereafter, the same method is repeated for multiple sec- (Continued)

ondary ECUs. In this way, achievement of fast, non-sequential, and single step validation of vehicle security is enabled.

14 Claims, 6 Drawing Sheets

(56) References Cited

U.S. PATENT DOCUMENTS

| | | | | |
|---|---|---|---|---|
| 2017/0111177 | A1* | 4/2017 | Oguma | H04L 9/3273 |
| 2017/0134164 | A1* | 5/2017 | Haga | G06F 21/445 |
| 2017/0366342 | A1 | 12/2017 | Gehrmann | |
| 2018/0091550 | A1* | 3/2018 | Cho | H04L 5/0055 |
| 2019/0028448 | A1* | 1/2019 | Farrell | H04L 63/062 |
| 2020/0334554 | A1* | 10/2020 | Takahashi | G06N 20/00 |
| 2021/0075606 | A1 | 3/2021 | Zeh | |
| 2022/0385553 | A1* | 12/2022 | Adachi | H04L 43/0823 |
| 2022/0415097 | A1* | 12/2022 | Kodama | H04L 67/12 |
| 2023/0087311 | A1* | 3/2023 | Soffer | G06F 21/85 |
| | | | | 726/23 |

OTHER PUBLICATIONS

Notice or Reasons for Refusal dispatched Feb. 6, 2025 from corresponding Japanese patent application No. 2024-500235.

Decision to Grant issued Apr. 10, 2025 from corresponding Japanese patent application No. 2024-500235.

The Intellectual Property Office Search Report dated Apr. 22, 2022 for the priority GB Patent Application No. 2109903.1.

The International Search Report and the Written Opinion of the International Searching Authority mailed on Oct. 18, 2022 for the PCT Application No. PCT/EP2022/067390 which this application claims priority.

Mahdi Dibaei et al., "An Overview of Attacks and Defences on Intelligent Connected Vehicles", arXiv:1907.07455 [cs.CR], Jul. 17, 2019.

Stefan Brunner et al., "Automotive E/E-architecture enhancements by usage of ethernet TSN", 2017 13th Workshop on Intelligent Solutions in Embedded Systems (WISES), Date of Conference: Jun. 12-13, 2017, Hamburg, Germany, DOI: 10.1109/WVISES.2017. 7986925.

N. Asokan et al., "ASSURED: Architecture for Secure Software Update of Realistic Embedded Devices", IEEE Transactions on Computer-Aided Design of Integrated Circuits and Systems ( vol. 37, Issue: 11, Nov. 2018), pp. 2290-2300, Date of Publication: Oct. 16, 2018, DOI: 10.1109/TCAD.2018.2858422.

Rivest R et al., "Programming Techniques: How to Share a Secret", Nov. 1, 1979 (Nov. 1, 1979), XP055890423, Retrieved from the Internet: URL:https://web.mit.edu/6.857/OldStuff/Fal 103/ref/Shamir-HowToShareASecret.pdf.

\* cited by examiner

METHOD AND SYSTEM FOR VALIDATING SECURITY OF A VEHICLE

CROSS-REFERENCE TO RELATED APPLICATIONS

The present application is a National Stage Application under 35 U.S.C. § 371 of International Patent Application No. PCT/EP2022/067390 filed on Jun. 24, 2022, and claims priority from United Kingdom Application No. 2109903.1 filed on Jul. 9, 2021, in the United Kingdom Patent Office, the disclosures of which are herein incorporated by reference in their entireties.

TECHNICAL FIELD

The present subject matter relates generally to the field of cryptography and vehicle security, and more particularly, but not exclusively to a method and a system for validating security of a vehicle.

BACKGROUND

Nowadays, vehicles have a large number of Electronic Control Units (ECUs) forming an in-vehicle network. These ECUs may be classified into one of critical ECUs and non-critical ECUs based on their functionality and customized definition provided by Original Equipment Manufacturer (OEM). For instance, ECUs controlling critical functions of the vehicle such as safety and security functionality, Anti-lock Braking System (ABS) functionality, power train functionality, surround view and warning functionality, gateway functionality and the like, may be considered as critical ECUs, and the remaining ECUs that control other non-critical functions of the vehicle such as infotainment system functionality, Heating, ventilation, and Air Conditioning (HVAC) control functionality, power window control functionality, and the like may be considered as non-critical ECUs. During start-up phase of the vehicle, the ECUs present in the vehicle require a security verification to ensure authenticity of the ECUs in the in-vehicle network. In other words, the security verification may determine if the critical ECUs of the vehicle have been manipulated by third party attackers/hackers. If the critical ECUs are manipulated by the third party attackers/hackers, the vehicle would be under the control of the third party attackers/hackers after the start-up phase of the vehicle. Therefore, it is not only mandatory but extremely critical to verify the authenticity of the ECUs, at least the critical ECUs during the start-up phase.

The existing approaches apply security signature and security verification to check authenticity of the ECUs, which is performed sequentially, thereby taking longer time for security verification, and in turn exceeds a minimal start up time causing a delay during the start-up phase. This may degrade the user experience level. Also, such sequential approach which takes a longer time to perform security verification leads to low coverage of the necessary ECUs to be verified in the minimal start-up time. Such low coverage may lead to missing out on the security verification of the critical ECUs during the start-up phase, which can lead to a critical security issue.

Currently, existing approaches do not provide a mechanism for security verification that is non-sequential, that potentially reduces the verification time and enhances coverage of the ECs during security verification.

The information disclosed in this background of the disclosure section is only for enhancement of understanding of the general background of the disclosure and should not be taken as an acknowledgement or any form of suggestion that this information forms prior art already known to a person skilled in the art.

SUMMARY

Disclosed herein is a method of validating security of a vehicle. In-vehicle network of the vehicle is partitioned into predefined zones and each of the predefined zones is provided with a plurality of ECUs that are classified into at least one of primary ECUs or secondary ECUs. Each predefined zone comprises a zone master ECU associated with each of the plurality of ECUs of the corresponding predefined zone. The method includes requesting, by an authentication system integrated in a zone master ECU of a predefined zone, pre-allocated signed unique cryptographic key shares from a plurality of primary ECUs associated with the zone master ECU, when there is an authentication requirement in the in-vehicle network. Thereafter, the method includes computing a first unique signature of the predefined zone using a predefined number (K−1) of the pre-allocated signed unique cryptographic key shares received from the plurality of primary ECUs. Upon computing the first unique signature of the predefined zone, the method includes verifying validity of the computed first unique signature using a public key, to authenticate each of the plurality of primary ECUs in the predefined zone. Finally, the method includes providing the verified first unique signature to a vehicle master ECU associated with the zone master ECU of each predefined zone, to enable the vehicle master ECU to activate safety functionalities associated with each of the plurality of primary ECUs of each predefined zone.

Further, the present disclosure discloses an authentication system for validating security of a vehicle. An in-vehicle network of the vehicle is partitioned into predefined zones and each of the predefined zones is provided with a plurality of ECUs that are classified into at least one of primary ECUs or secondary ECUs. Each predefined zone comprises a zone master ECU associated with each of the plurality of ECUs of the corresponding predefined zone. The authentication system comprising a processor and a memory communicatively coupled to the processor. The memory stores the processor instructions, which, on execution, causes the processor to request pre-allocated signed unique cryptographic key shares from a plurality of primary ECUs associated with the zone master ECU, when there is an authentication requirement in an in-vehicle network. Thereafter, the processor computes a first unique signature of the predefined zone using a predefined number (K−1) of the pre-allocated signed unique cryptographic key shares received from the plurality of primary ECUs. Upon computing the first unique signature of the predefined zone, the processor verifies validity of the computed first unique signature using a public key, to authenticate each of the plurality of primary ECUs in the predefined zone. Finally, the processor provides the verified first unique signature to a vehicle master ECU associated with the zone master ECU of each predefined zone, to enable the vehicle master ECU to activate safety functionalities associated with each of the plurality of primary ECUs of each predefined zone.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

The accompanying drawings, which are incorporated in and constitute a part of this disclosure, illustrate exemplary embodiments and, together with the description, serve to explain the disclosed principles. In the figures, the left-most digit(s) of a reference number identifies the figure in which the reference number first appears. The same numbers are used throughout the figures to reference like features and components. Some embodiments of system and/or methods in accordance with embodiments of the present subject matter are now described, by way of example only, and with reference to the accompanying figures, in which.

DETAILED DESCRIPTION

Figure 1A:
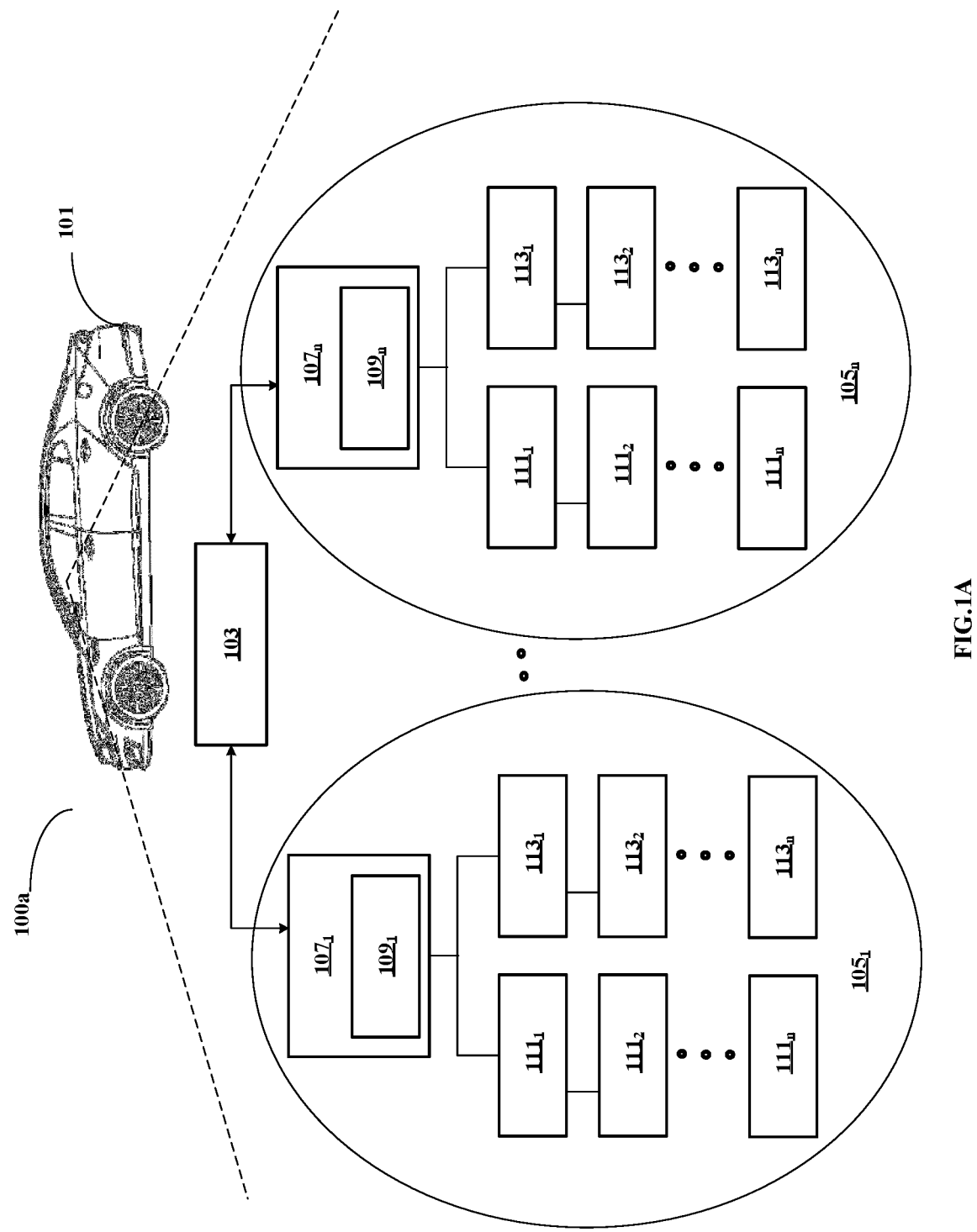
FIG. 1A shows an exemplary architecture for validating security of a vehicle in accordance with some embodiments of the present disclosure.

It should be appreciated by those skilled in the art that any block diagrams herein represent conceptual views of illustrative systems embodying the principles of the present subject matter. Similarly, it will be appreciated that any flow charts, flow diagrams, state transition diagrams, pseudo code, and the like represent various processes which may be substantially represented in computer readable medium and executed by a computer or processor, whether or not such computer or processor is explicitly shown.

In the present document, the word "exemplary" is used herein to mean "serving as an example, instance, or illustration." Any embodiment or implementation of the present subject matter described herein as "exemplary" is not necessarily be construed as preferred or advantageous over other embodiments.

While the disclosure is susceptible to various modifications and alternative forms, specific embodiment thereof has been shown by way of example in the drawings and will be described in detail below. It should be understood, however that it is not intended to limit the disclosure to the forms disclosed, but on the contrary, the disclosure is to cover all modifications, equivalents, and alternative falling within the scope of the disclosure.

The terms "comprises", "comprising", "includes" or any other variations thereof, are intended to cover a non-exclusive inclusion, such that a setup, device or method that includes a list of components or steps does not include only those components or steps but may include other components or steps not expressly listed or inherent to such setup or device or method. In other words, one or more elements in a system or apparatus proceeded by "comprises . . . a" does not, without more constraints, preclude the existence of other elements or additional elements in the system or method.

Disclosed herein is a method and a system for validating security of a vehicle. In some embodiments, the vehicle comprises an in-vehicle network, that connects vehicle components such as the control units, sensors, mechanical parts, and various systems and sub-systems within the vehicle for enabling internal communication between the vehicle components. In an embodiment, the in-vehicle network of the vehicle may be partitioned into predefined zones and each of the predefined zones may be provided with a plurality of Electronic Control Units (ECUs). In some embodiments, the plurality of ECUs may be classified into primary ECUs and secondary ECUs. In some embodiments, the primary ECUs may be critical ECUs that may perform critical functionality of the vehicle, and the secondary ECUs may be non-critical ECUs that may perform non-critical functionality of the vehicle. For instance, primary/critical ECUs perform critical functionality of the vehicle such as safety and security functionality, Anti-lock Braking System (ABS) functionality, power train functionality, surround view and warning functionality, gateway functionality and the like, and the remaining ECUs i.e. secondary/non-critical ECUs may perform non-critical functions of the vehicle such as infotainment system functionality, Heating, ventilation, and Air Conditioning (HVAC) control functionality, power window control functionality, and the like.

Further, each predefined zone of the in-vehicle network may include a zone master ECU associated with each of the plurality of ECUs of the corresponding predefined zone. Each zone master ECU in the in-vehicle network may be integrated with an authentication system. The present disclosure may be performed only by the zone master ECUs integrated with the authentication system. The method is explained in the present disclosure in terms of one zone master ECU belonging to a predefined zone in the vehicle. However, this is just for the purpose of the illustration and ease of understanding, and should not be construed as a limitation of the present disclosure.

The authentication system may request pre-allocated signed unique cryptographic key shares from each of a plurality of primary ECUs associated with the zone master ECU, when there is an authentication requirement in an in-vehicle network. Upon receiving the pre-allocated signed unique cryptographic key shares received from the plurality of primary ECUs, the authentication system may compute a first unique signature of the predefined zone using a pre-defined number (K−1) of pre-allocated signed unique cryptographic key shares received from the plurality of primary ECUs. In some embodiments, the predefined number (K−1) of pre-allocated signed unique cryptographic key shares may be defined/computed at the time of manufacture of the vehicle, or at the time of installation of zone master ECUs in each of the predefined zones. As an example, the predefined number (K−1) may be 3, which means that, the authentication system may compute the first unique signature of the predefined zone using only 3 pre-allocated signed unique cryptographic key shares received from the plurality of primary ECUs. However, this should not be construed as a limitation, as the predefined number (K−1) may vary and may be dynamically configurable. In some embodiments, the 3 pre-allocated signed unique cryptographic key shares that are selected for computing the first unique signature may be the 3 pre-allocated signed unique cryptographic key shares that are first received by the ECU. In some other embodiments, the 3 pre-allocated signed unique cryptographic key shares that are selected for computing the first unique signature may be selected randomly among the received pre-allocated signed unique cryptographic key shares. In yet other embodiments, the 3 pre-allocated signed unique cryptographic key shares that are selected for computing the first unique signature may be selected based on rules. For example, the rule may indicate "select the pre-allocated signed unique cryptographic key shares received from critical ECUs related to Anti-lock Braking System for generating first unique signature".

Thereafter, the authentication system may verify validity of the computed first unique signature using a public key of the predefined zone, to authenticate each of the plurality of primary ECUs in the corresponding predefined zone. Upon verifying first unique signature, the authentication system may provide the verified first unique signature to a vehicle master ECU associated with the zone master ECU of each predefined zone, to enable the vehicle master ECU to activate safety functionalities associated with each of the plurality of primary ECUs of each predefined zone. Upon validating the plurality of primary ECUs first, the authentication system may then validate a plurality of secondary ECUs using the same method as disclosed above for the plurality of primary ECUs.

In the present disclosure, the primary ECUs (critical ECUs) are verified first, and then followed by the secondary ECUs (non-critical ECUs). When critical ECUs are attacked by the third party attackers, it may completely compromise the security of the vehicle and handover control of the vehicle to the third party attackers. Therefore, authenticating critical ECUs first not only enables in checking authenticity of most important ECUs of the vehicle with full coverage, but also ensures high security. Moreover, the method disclosed in the present disclosure is not a sequential method of authenticating each ECU of a predefined zone one after the other, rather, the method disclosed in the present disclosure enables parallel verification in each of the predefined zones, and also with only predefined number (K−1) key shares received from the primary ECUs in each zone. Therefore, the present disclosure eliminates the need to wait for a response from each ECU to authenticate that ECU. Rather, the present disclosure enables using (K−1) key shares received from (K−1) number of primary ECUs in a predefined zone, and authenticates each of the primary ECU in that zone in one shot based on the unique signature computed using the (K−1) key shares. In the present disclosure, the sequential approach of verification is eliminated, and a parallel approach of verification is carried out i.e. parallel verification in each predefined zone, and also single step verification within each predefined zone. Such parallel and single step verification reduces the time taken to verify authenticity of the ECUs when there is an authentication requirement, for instance, during start-up phase of the vehicle. Moreover, since only (K−1) key shares are used for computing the first/second unique signature which is used for on-shot verification of the ECUs within the predefined zone, the time required for verifying the authenticity is further reduced compared to the existing techniques. Additionally, in the present disclosure, the secondary ECUs are verified for authenticity after the primary ECUs due to their non-critical nature. Therefore, verifying authenticity of the secondary ECUs even after the start-up phase, after the verification of the primary ECUs (required for start-up itself), may not harm the in-vehicle network. Moreover, performing validation of the secondary/non-critical ECUs at a later stage after start-up, may enhance the speed of validation of primary/critical ECUs at the start-up phase, eliminates unnecessary delays during the start-up phase, enhances coverage of the primary/critical ECUs at the start-up phase, and also enhances user experience due to faster validation of critical security health check leading to fast start-up.

A description of an embodiment with several components in communication with each other does not imply that all such components are required. On the contrary, a variety of optional components are described to illustrate the wide variety of possible embodiments of the disclosure.

In the following detailed description of the embodiments of the disclosure, reference is made to the accompanying drawings that form a part hereof, and in which are shown by way of illustration specific embodiments in which the disclosure may be practiced. These embodiments are described in sufficient detail to enable those skilled in the art to practice the disclosure, and it is to be understood that other embodiments may be utilized and that changes may be made without departing from the scope of the present disclosure. The following description is, therefore, not to be taken in a limiting sense.

FIG. 1A shows an exemplary architecture for validating security of a vehicle in accordance with some embodiments of the present disclosure.

The architecture 100 of an in-vehicle network includes a vehicle 101, a vehicle master Electronic Control Unit (ECU) 103, a predefined zone $105_1$ to predefined zone $105_n$ (collectively referred as predefined zones 105), a zone master ECU $107_1$ to zone master ECU $107_n$ (collectively referred as zone master ECUs 107), an authentication system $109_1$ to authentication system $109_n$ (collectively referred as authentication system $109_1$, primary ECU $111_1$ to primary ECU $111_n$ (collectively referred as plurality of primary ECUs 111), and secondary ECU $113_1$ to secondary ECU $113_n$ (collectively referred as plurality of secondary ECUs 113). In some embodiments, the in-vehicle network may be a network through which various ECUs, sensors, mechanical parts, and various systems and sub-systems communicate within the vehicle 101. As an example, the vehicle 101 may be a car, a bus, a truck, a lorry and the like, which are integrated with ECUs and systems capable of communicating through the in-vehicle network. In some embodiments, the vehicle 101 may be an autonomous vehicle or a non-autonomous vehicle. In some embodiments, the in-vehicle network may be divided into predefined zones. The predefined zone may be an area within the in-vehicle network comprising, for instance, ECUs related to similar type of functionality, ECUs related to different types of functionalities, ECUs related to same or different levels of criticality and the like. As an example, "safety system zone" may be a predefined zone comprising ECUs related to safety, for instance, ECUs such as Anti-lock Brake System (ABS), Supplemental Restraint System (SRS) and Emergency Brake Assist (EBA). In another example, "Powertrain control zone" may be a predefined zone comprising ECUs related to engine control, transmission control and oil supply control. In some embodiments, the plurality of primary ECUs 111 and the plurality of secondary ECUs 113 belonging to each predefined zone 105 of the vehicle 101 may be associated with a functionality. In some embodiments, the plurality of primary ECUs 111 may be critical ECUs that may perform critical functionality of the vehicle 101, and the plurality of secondary ECUs 113 may be non-critical ECUs that may perform functionality of the vehicle 101 which are different from functionalities performed by the plurality of primary ECUs 111. For instance, the plurality of primary/critical ECUs 111 may perform critical functionality of the vehicle 101 such as safety and security functionality, Anti-lock Braking System (ABS) functionality, power train functionality, surround view and warning functionality, gateway functionality and the like, and the remaining ECUs i.e. secondary/non-critical ECUs 113 may perform functions of the vehicle that are different from the functions of the plurality of primary ECUs 111 such as infotainment system functionality, Heating, ventilation, and Air Conditioning (HVAC) control functionality, power window control functionality. In some embodiments, each of the plurality of primary ECUs 111 and each of the plurality of secondary ECUs 113 communicate with each other. In some embodiments, each of the plurality of primary ECUs 113 communicate with each other via a secured communication, for instance, an encrypted communication or an authenticated communication.

Figure 1B:
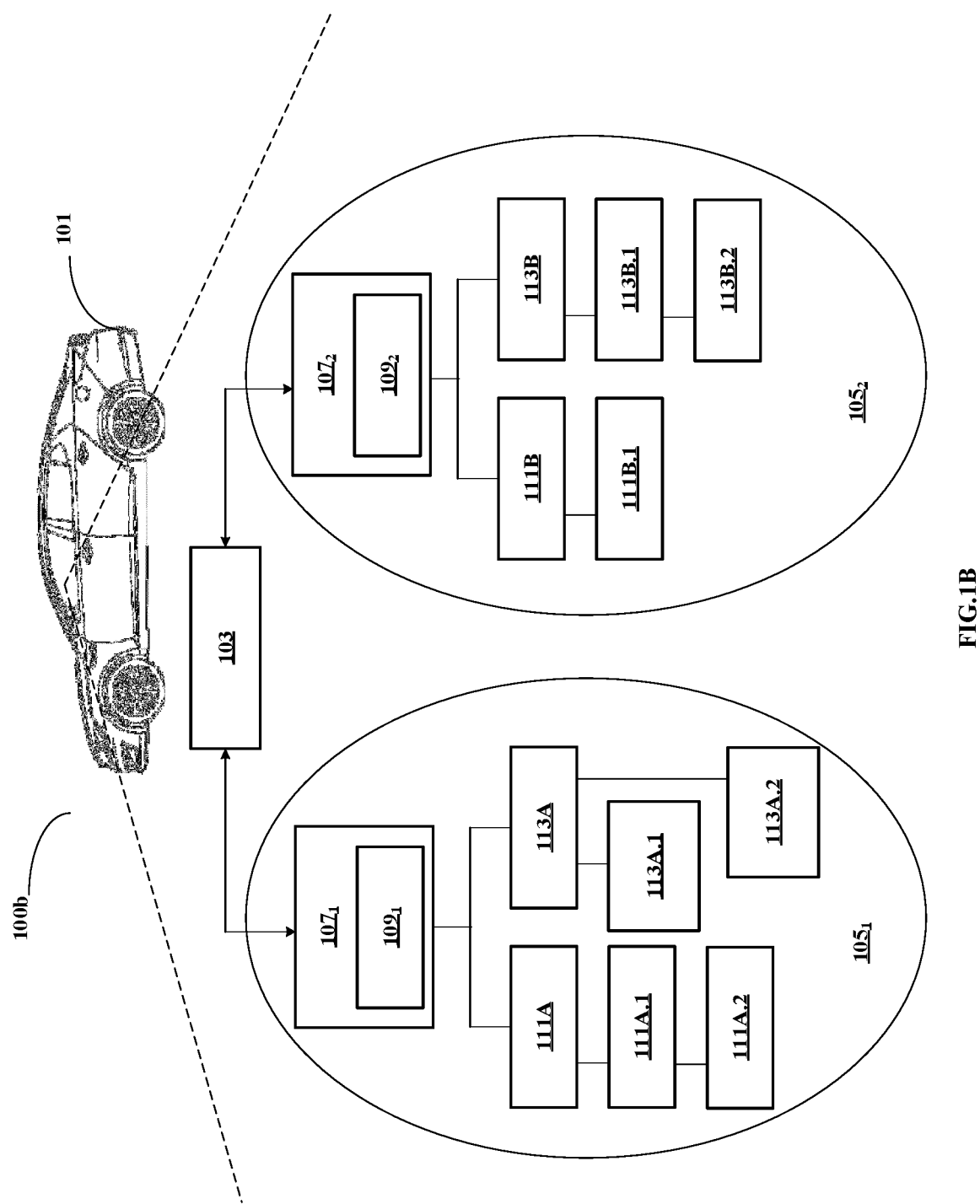
FIG. 1B shows another exemplary architecture for validating security of a vehicle in accordance with some embodiments of the present disclosure.

In some embodiments, as shown in the FIG. 1A, the in-vehicle network may be partitioned into predefined zones $105_1$ to $105_n$. Each predefined zone 105 of the in-vehicle network may include one zone master ECU 107. Further, each zone master ECU 107 may be communicatively connected to the plurality of primary ECUs 111 and the plurality of secondary ECUs 113 within the corresponding predefined zone 105. For instance, as shown in the FIG. 1B, the predefined zone $105_1$ may include a zone master ECU $107_1$, which is further communicatively connected to the primary ECU 111A and the secondary ECU 113A. The primary ECU 111A may further be communicatively connected to the primary ECU 111A.1 and primary ECU 111A.2. The secondary ECU 113A may further be communicatively connected to the secondary ECU 113A.1 and secondary ECU 113A.2. Further, for instance, as shown in the FIG. 1B, the predefined zone $105_2$ may include a zone master ECU $107_2$, which is further communicatively connected to the primary ECU 111B and the secondary ECU 113B. The primary ECU 111B may further be communicatively connected to the primary ECU 111B.1. The secondary ECU 113B may further be communicatively connected to the secondary ECU 113B.1 and secondary ECU 113B.2. The arrangement of the plurality of primary ECUs 111 and the plurality of secondary ECUs 113 within the predefined zones 105 as illustrated in the FIG. 1A and FIG. 1B are purely exemplary and the arrangement may be different or varied based on the vehicle, model of the vehicle, features provided by the vehicle and the like. Therefore, the arrangement as shown in the FIG. 1A and FIG. 1B should not be construed as a limitation. It is just for understanding of the reader.

Furthermore, each zone master ECU 107 may be integrated with the authentication system 109. As shown in the FIG. 1A, the zone master ECU $107_1$ may be integrated with the authentication system $109_1$ and similarly, the zone master ECU $107_n$ may be integrated with the authentication system $109_n$. In some embodiments, the zone master $107_1$ to $107_n$ belonging to the predefined zone $105_1$ to $105_n$ respectively, may be connected to the vehicle master ECU 103 via a communication network (not shown in the FIG. 1A). In some embodiments, the communication network may be one of wired communication network or wireless communication network.

Figure 1C:
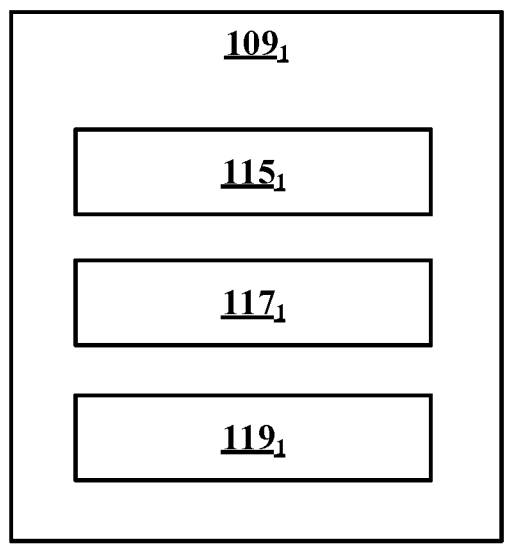
FIG. 1C shows brief block diagram of an exemplary authentication system for validating security of a vehicle in accordance with some embodiments of the present disclosure.

Hereinafter, the method of the present disclosure is disclosed in terms of one authentication system 109, for instance $109_1$. However, this should not be construed as a limitation as the same method is performed by each authentication system $109_1$ to $109_n$ integrated in each predefined zones $105_1$ to $105_n$ within the in-vehicle network. In some embodiments, as shown in the FIG. 1C, the authentication system $109_1$ may include a processor $115_1$, an Input/Output (I/O) interface $117_1$ and a memory $119_1$. The processor $115_1$ may request pre-allocated signed unique cryptographic key shares from each of a plurality of primary ECUs 111A associated with the zone master ECU $105_1$, when there is an authentication requirement in an in-vehicle network. In some embodiments, the pre-allocated signed unique cryptographic key shares are present due to performing the process of generating signed unique cryptographic key shares and allocating the generated signed unique cryptographic key shares to each of the plurality of primary ECUs 111A and the secondary ECUs 113A, prior to performing the method disclosed in the present disclosure. In some embodiments, the concept and process of generating signed unique cryptographic key shares and allocating the generated signed unique cryptographic key shares to various ECUs in the in-vehicle network is disclosed in the UK Patent Application number: 2108705.1, titled "A METHOD AND SYSTEM FOR SECRET KEY SHARING FOR AN IN-VEHICLE NETWORK". The entire disclosure of the UK Patent Application number: 2108705.1 is incorporated herein by reference.

The I/O interface $117_1$ may receive the pre-allocated signed unique cryptographic key shares from each of the plurality of primary ECUs 111A associated with the zone master ECU $107_1$. In some embodiments, each of the pre-allocated signed unique cryptographic key shares received from the plurality of primary ECUs 111A may be encrypted using a random number or nonce. Further, the processor $115_1$ may compute a first unique signature of the predefined zone $105_1$ using a predefined number (K-1) of the pre-allocated signed unique cryptographic key shares received from the plurality of primary ECUs 111A. In some embodiments, the predefined number (K-1) of the pre-allocated signed unique cryptographic key shares may be defined at the time of manufacture of the vehicle 101, or at the time of installation of zone master ECUs $107_1$ to $107_n$ of each predefined zone $105_1$ to $105_n$. As an example, the predefined number (K-1) may be 3, which means that, the authentication system may compute the first unique signature of the predefined zone using only 3 pre-allocated signed unique cryptographic key shares received from the plurality of primary ECUs 111A of the predefined zone $105_1$. However, this should not be construed as a limitation, as the predefined number (K-1) may vary and may be dynamically configurable. In some embodiments, the predefined number (K-1) of the unique cryptographic key shares are selected based on one of a First Come First Serve (FCFS) technique, a random selection technique, or a rule-based technique. Thereafter, the processor $115_1$ may verify validity of the computed first unique signature using a public key, to authenticate each of the plurality of primary ECUs 111A in the predefined zone $105_1$. In some embodiments, public key may be a numerical value which is used for the purpose of encryption and authentication. In some embodiments, the public key for each predefined zone 105 is obtained from a storage unit (not shown in the FIG. 1A and FIG. 1B) associated with the corresponding zone master ECU 107, for verifying the validity of the computed first unique signature. Upon verifying the validity of the computed first unique signature, the processor $115_1$ may provide the verified first unique signature to the vehicle master ECU 103 associated with the zone master ECUs $107_1$ to $107_n$ of each predefined zone $105_1$ to $105_n$. In some embodiments, the vehicle master ECU 103 may activate safety functionalities associated with each of the plurality of primary ECUs 111A and 111B of the predefined zones $105_1$ and $105_2$, using the verified first unique signature, as shown in the exemplary scenario in FIG. 1B. However, if there were "n" number of primary ECUs, the vehicle master ECU 103 may activate safety functionalities associated with each of the "n" number of primary ECUs of the predefined zones $105_1$ and $105_n$, using the verified first unique signature.

In some embodiments, upon performing the security validation for the plurality of primary ECUs 111A of the predefined zone $105_1$, the processor $115_1$ may perform the security validation of the plurality of secondary ECUs 113A of the predefined zone $105_1$. In some embodiments, the plurality of secondary ECUs 113A may be validated after validation of the plurality of the primary ECUs 111A to prioritize the ECUs with critical functionality over the ECUs with non-critical functionality. In order to validate the plurality of secondary ECUs 113A of the predefined zone $105_1$, the processor $115_1$ may request pre-allocated signed unique cryptographic key shares from each of the plurality of secondary ECUs 113A associated with the zone master ECU $107_1$. In some embodiments, the processor $115_1$ may compute a second unique signature of the predefined zone $105_1$ using a predefined number (K−1) of the pre-allocated signed unique cryptographic key shares received from the plurality of secondary ECUs 113A. Thereafter, the processor $115_1$ may verify validity of the computed second unique signature using the public key, to authenticate each of the plurality of secondary ECUs in the predefined zone and provide the verified second unique signature to the vehicle master ECU 103 associated with the zone master ECUs $107_1$ to $107_n$ of each predefined zone $105_1$ to $105_n$. In some embodiments, the vehicle master ECU 103 may activate other functionalities associated with each of the plurality of secondary ECUs 113A and 113B of the predefined zones $105_1$ and $105_n$, using the verified second unique signature, as shown in the exemplary scenario in FIG. 1B. However, if there were "n" number of secondary ECUs, the vehicle master ECU 103 may activate safety functionalities associated with each of the "n" number of secondary ECUs of the predefined zones $105_1$ and $105_n$, using the verified second unique signature.

Therefore, the method of validating security of the vehicle 101 may be a repetitive cycle, which is performed every time there is an authentication requirement in the in-vehicle network.

Figure 2A:
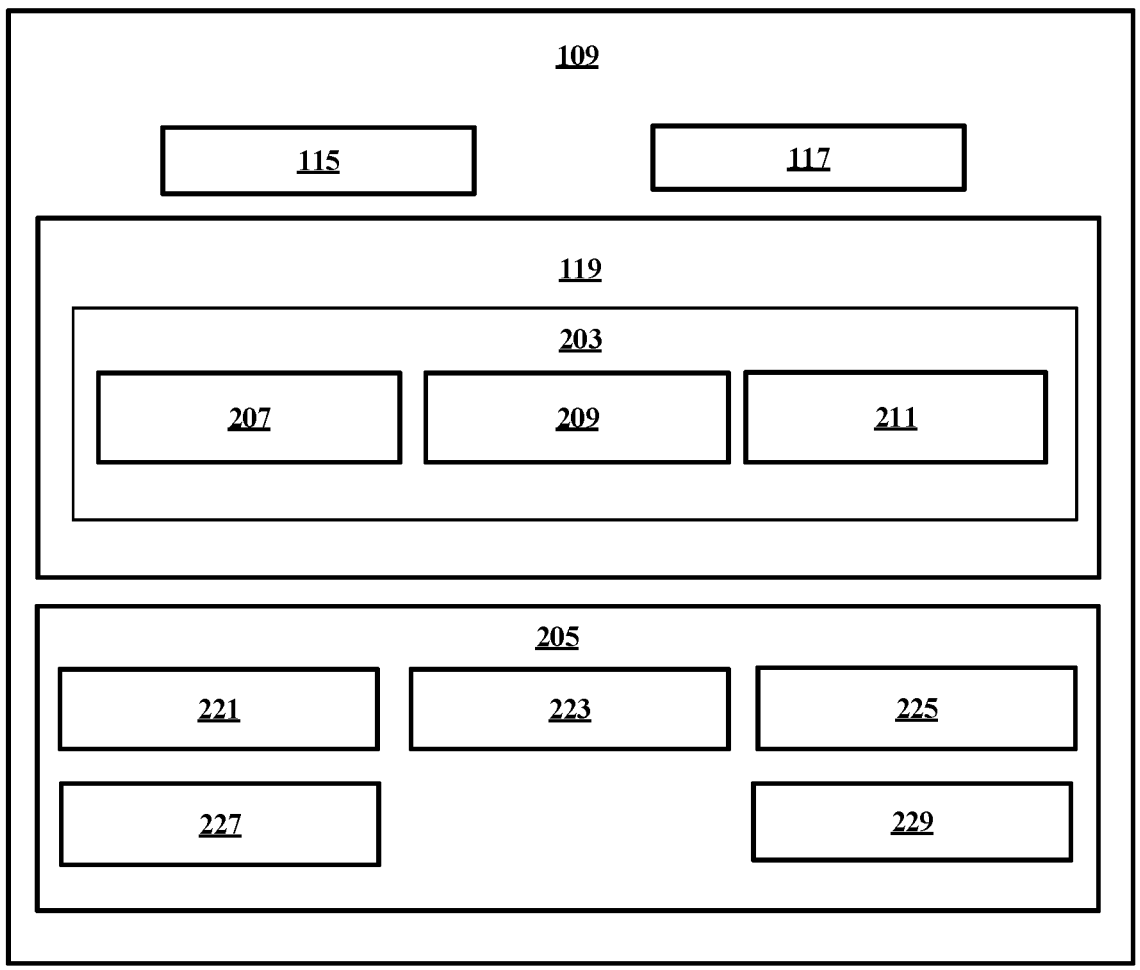
FIG. 2A shows a detailed block diagram of an exemplary authentication system for validating security of a vehicle in accordance with some embodiments of the present disclosure.

FIG. 2A shows a detailed block diagram of an authentication system 109 for validating security of a vehicle in accordance with some embodiments of the present disclosure.

In some implementations, the authentication system 109 integrated in each zone master Electronic Control Unit (ECU) 107 may include data 203 and modules 205. As an example, the data 203 is stored in a memory 119 of the authentication system 109 as shown in the FIG. 2A. In one embodiment, the data 203 may include key share data 207, signature data 209, and other data 211. In the illustrated FIG. 2A, modules 205 are described herein in detail.

In some embodiments, the data 203 may be stored in the memory 119 in form of various data structures. Additionally, the data 203 can be organized using data models, such as relational or hierarchical data models. The other data 215 may store data, including public key of a predefined zone 105, predefined number (K−1) of unique cryptographic key shares, temporary data and temporary files, generated by the modules 205 for performing the various functions of the authentication system 109.

In some embodiments, the key share data 207 may include pre-allocated signed unique cryptographic key shares received from each of a plurality of primary ECUs 111 associated with a zone master ECU 107 belonging to a predefined zone 105. In some embodiments, the authentication system 109 may receive the key share data 207 when there is an authentication requirement in an in-vehicle network.

In some embodiments, the signature data 209 may include a first unique signature of the predefined zone 105 and a second unique signature of the predefined zone 105. In some embodiments, the first unique signature of the predefined zone 105 may be related to the plurality of primary ECUs 111 present in the predefined zone 105 and the second unique signature of the predefined zone 105 may be related to the plurality of secondary ECUs 113 present in the predefined zone 105. The first unique signature may be determined using the predefined number (K−1) of the pre-allocated signed unique cryptographic key shares received from the plurality of primary ECUs 111. Similarly, the second unique signature may be determined using the predefined number (K−1) of the pre-allocated signed unique cryptographic key shares received from the plurality of secondary ECUs 113. In some embodiments, the first unique signature and the second unique signature may be computed each time the key share data 207 is received from the plurality of primary ECUs 111 and the secondary ECUs 113. In other words, the first unique signature and the second unique signature may be computed each time when there is an authentication requirement during start-up phase or any other phase of the vehicle 101.

In some embodiments, the data 203 stored in the memory 119 may be processed by the modules 205 of the authentication system 109. The modules 205 may be stored within the memory 119. In an example, the modules 205 communicatively coupled to the processor 115 of the authentication system 109, may also be present outside the memory 119 as shown in FIG. 2A and implemented as hardware. As used herein, the term modules 205 may refer to an application specific integrated circuit (ASIC), an electronic circuit, a processor (shared, dedicated, or group) and memory that execute one or more software or firmware programs, a combinational logic circuit, and/or other suitable components that provide the described functionality.

In some embodiments, the modules 205 may include, for example, a signature computing module 221, a receiving module 223, a signature verifying module 225, a transmitting module 227 and other modules 229. The other modules 229 may be used to perform various miscellaneous functionalities of the authentication system 109. It will be appreciated that such aforementioned modules 205 may be represented as a single module or a combination of different modules.

In some embodiments, the signature computing module 221 may request the pre-allocated signed unique cryptographic key shares from each of a plurality of primary ECUs 111 associated with the zone master ECU 107, when there is an authentication requirement in the in-vehicle network. As an example, consider the modules 205 reside in the authentication system $109_1$ of the zone master ECU $107_1$ belonging to the predefined zone $105_1$ for further explanation of the method hereafter. Therefore, the signature computing module 221 may request the pre-allocated signed unique cryptographic key shares from each of the plurality of primary ECUs 111A associated with the zone master ECU $107_1$. In some other embodiments, the signature computing module 221 may request the pre-allocated signed unique cryptographic key shares from few of the plurality of primary ECUs 111A associated with the zone master ECU $107_1$. However, the few of the plurality of primary ECUs 111A should be greater than predefined number (K−1) of the pre-allocated signed unique cryptographic key shares required for computing a first unique signature. In some embodiments, the authentication requirement may be any notification indicating requirement to authenticate the plurality of primary ECUs 111 and/or the plurality of secondary ECUs 113 integrated in each predefined zone 105 of the in-vehicle network. In some embodiments, the authentication requirement may arise at the start-up phase of the vehicle 101. In some other embodiments, the authentication requirement may arise after the start-up of the vehicle 101, in other words, the authentication requirement may arise when there is an occurrence of at least one of the predefined events. As an example, the predefined events may be ignition ON/OFF condition, wake-up mode of the ECUs, sleep mode of the ECUs, bus recovery condition, reception of predefined type of messages or data, and transmission of predefined type of messages or data, and the like.

Thereafter, the receiving module 223 may receive the pre-allocated signed unique cryptographic key shares received from the plurality of primary ECUs 111A. In some embodiments, the concept and process of generating signed unique cryptographic key shares and allocating the generated signed unique cryptographic key shares to various ECUs in the in-vehicle network prior to performing the method disclosed in the present disclosure is disclosed in the UK Patent Application number: 2108705.1, titled "A METHOD AND SYSTEM FOR SECRET KEY SHARING FOR AN IN-VEHICLE NETWORK". The entire disclosure of the UK Patent Application number: 2108705.1 is incorporated herein by reference. In some embodiments, the pre-allocated signed unique cryptographic key shares thus received from the plurality of primary ECUs 111A, may be encrypted using a random number or nonce. In some other embodiments, the pre-allocated signed unique cryptographic key shares thus received from the plurality of primary ECUs 111A may be in a plain text format. In some embodiments, each of the unique cryptographic key shares may be signed prior to allocation. For instance, the unique cryptographic key shares may be signed using the below Equation 1:

$$Sig(ECU_i) = m^{yi} \bmod N \qquad \text{Equation 1}$$

In the above Equation 1,

"i" may refer to an integer (1, 2 ... n);

"m" may refer to a preconfigured value;

"y" may refer to unique cryptographic key share, therefore, $y_1, y_2, \ldots y_k$ are unique cryptographic key shares of an original cryptographic key of the zone master ECU $107_1$;

"N" may refer to the public key; and

"mod N" may refer to a modulo of the public key determined using a predefined modular arithmetic technique.

In some embodiments, the signature computing module 221 may then compute the first unique signature of the predefined zone using the predefined number (K−1) of the pre-allocated signed unique cryptographic key shares received from the plurality of primary ECUs. As an example, the predefined number (K−1) may be 3, which means that, the authentication system may compute the first unique signature of the predefined zone using only 3 pre-allocated signed unique cryptographic key shares received from the plurality of primary ECUs 111A of the predefined zone $105_1$. However, this should not be construed as a limitation, as the predefined number (K−1) may vary and may be dynamically configurable. In some embodiments, the predefined number (K−1) of the pre-allocated unique cryptographic key shares are selected based on one of a First Come First Serve (FCFS) technique, a random selection technique, or a rule-based technique. As an example, the signature computing module 221 may compute the first unique signature using first three pre-allocated signed unique cryptographic key shares received from three primary ECUs. In another example, the signature computing module 221 may randomly select three pre-allocated signed unique cryptographic key shares received from three primary ECUs for computing the first unique signature. In yet another example, the signature computing module 221 may select three unique cryptographic key shares received from three different ECUs based on one or more predefined rules, for computing the first unique signature. As an example, if a predefined rule indicates "select the signed unique cryptographic key shares received from primary ECUs relating to Anti-Lock Braking functionality for computing first unique signature", the signature computing module 221 may select three unique cryptographic key shares received from three primary ECUs relating to Anti-Lock Braking System (ABS) functionality and use them for computing the first unique signature.

In some embodiments, the signature computing module 221 may compute the first unique signature based on the pre-allocated signed unique cryptographic key shares received from the plurality of primary ECUs 111A of the predefined zone $105_1$, using the below Equation 2:

$$Sig(ECU_1 + ECU_2 +, \ldots, +ECU_{k-1}) = m^s \bmod N \qquad \text{Equation 2}$$

In the above Equation 2, $Sig(ECU_1+ECU_2+, \ldots, +ECU_{k-1})$ indicates aggregation of the signed unique cryptographic key shares received from the plurality of primary ECUs;

"m" is a preconfigured value;

"S" is equal to (y1+y2, ..., +yk−1), wherein "y" is the unique cryptographic key share;

"K−1" indicates predefined number of signed unique cryptographic key shares required for computing the unique first signature;

"N" is the public key; and

"mod N" is a modulo of the public key determined using a predefined modular arithmetic technique.

In the above Equation 2, the signature computing module 221 may aggregate (K−1) number of signed unique cryptographic key shares received from the plurality of primary ECUs 111A to obtain the unique first signature. In some embodiments, the (K−1) number of signed unique cryptographic key shares may be aggregated in the form of: $m^S$ mod N, as shown in the Equation 2. "S" indicates a summation of the (K−1) number of signed unique cryptographic key shares i.e. (y1+y2, ..., +yk−1). As an example, consider the predefined number (K−1) is 3. Therefore, the first unique signature may be computed as shown below using the Equation 2:

$Sig(ECU_1+ECU_2+ECU_3)$ i.e. [unique first signature]$=m^{(y1+y2+y3)} \bmod N$

In some embodiments, the public key "N" for each predefined zone 105 is obtained from a storage unit associated with the corresponding zone master ECU 107 of the corresponding predefined zone 105, for verifying the validity of the computed first unique signature. In some embodiments, the public key "N" may be different for each predefined zone 105. The public key "N" may be one of predefined or may be dynamically configured when there is an authentication requirement.

In some embodiments, upon computing the first unique signature, the signature verifying module 225 may verify validity of the computed first unique signature to authenticate each of the plurality of primary ECUs 111A in the predefined zone $105_1$. In some embodiments, the validity of the computed first signature may be verified using the public key (N, e) of the predefined zone $105_1$. In some embodiments, verifying validity of the computed first unique signature may include checking whether the first unique signature formed using (K−1) shares of the pre-allocated signed unique cryptographic key shares, corresponds to the original cryptographic key. In some embodiments, each combination of (K−1) shares of the pre-allocated signed unique cryptographic key shares may result in different first unique signature. However, the first unique signature so formed should be in compliance with the original cryptographic key of the predefined zone $105_1$.

In some embodiments, if the first unique signature is successfully verified by the zone master ECU $105_1$, the transmitting module 227 may provide the verified unique first signature to a vehicle master ECU 103 associated with the zone master ECUs $107_1$ to $107_n$ of each predefined zone $105_1$ to $105_n$. Similarly, the transmitting module 227 of each of the zone master ECUs $107_1$ to $107_n$ may transmit the corresponding verified first unique signature to the vehicle master ECU 103. In some embodiments, upon receiving the corresponding verified first unique signature from each of the zone master ECUs $107_1$ to $107_n$, the vehicle master ECU 103 may validate security of the vehicle 101 as a whole. In some embodiments, to validate the security of the vehicle 101 as a whole, the vehicle master ECU 103 may determine if the validity of the first unique signature received from each of the zone master ECUs $107_1$ to $107_n$ is successfully verified. In some embodiments, successful verification of validity of the first unique signature of a predefined zone $105_1$ may indicate authenticity of the plurality of primary ECUs 111A present in the predefined zone $105_1$. Therefore, when the first unique signatures of each of the predefined zones $105_1$ to $105_n$ are determined to be valid, the vehicle master ECU 103 may determine each of the plurality of primary ECUs 111 present in each of the predefined zones $105_1$ to $105_n$ to be valid, thereby validating the security of the vehicle 101 or more precisely critical security of the vehicle 101 as only the plurality of primary ECUs 111 have been authenticated first. Upon successfully validating the security of the vehicle 101, the vehicle master ECU 103 may activate one or more safety functionalities associated with each of the plurality of primary ECUs 111 of each predefined zone $105_1$ to $105_n$. In some embodiments, the safety functionalities may be equivalent to critical functionalities related to the vehicle. As an example, the safety functionalities/critical functionalities may include, but not limited to, airbag functionality, Anti-lock Braking System (ABS) functionality, power train functionality, surround view and warning functionality, gateway functionality and the like. In case, the first unique signatures are determined to be not valid for any of the predefined zones $105_1$ to $105_n$, the vehicle master ECU 103 may determine that one or more of the plurality of primary ECUs 111 have been attacked by third party attackers/hackers. In some other embodiments, if the first unique signatures are determined to be not valid for any of the predefined zones $105_1$ to $105_n$, the corresponding zone master ECU 107 itself may notify the vehicle master ECU 103 regarding such security breach and may enable the vehicle master ECU 103 to take a suitable action towards such security breach.

In some embodiments, upon validating the security of the vehicle 101 with respect to the plurality of primary ECUs 111 in each of the predefined zones $105_1$ to $105_n$, the authentication system 109 may validate the security of the vehicle 101 with respect to the plurality of secondary ECUs 113. In some embodiments, the authentication system 109 may validate the security of the vehicle 101 with respect to the plurality of secondary ECUs 113 using the same method as disclosed above to validate the security of the vehicle 101. However to briefly reiterate, the signature computing module 221 may request pre-allocated signed unique cryptographic key shares from each of a plurality of secondary ECUs 113A associated with the zone master ECU $107_1$, upon validating the plurality of primary ECUs 111A. Thereafter, the receiving module 223 may receive pre-allocated signed unique cryptographic key shares received from the plurality of secondary ECUs 113A. Subsequently, the signature computing module 221 may compute a second unique signature of the predefined zone $105_1$ using the predefined number (K−1) of the pre-allocated signed unique cryptographic key shares received from the plurality of secondary ECUs 113A. In some embodiments, the signature computing module 221 may compute the second unique signature using the Equation 2 which is same equation used to compute the first unique signature. Upon computing the second unique signature, the signature verifying module 225 may verify validity of the computed second unique signature using the public key (N, e), to authenticate each of the plurality of secondary ECUs 113A in the predefined zone $105_1$. Thereafter, the transmitting module 227 may provide the verified second unique signature to the vehicle master ECU 103 associated with the zone master ECU $107_1$ of the predefined zone $105_1$.

In some embodiments, the vehicle master ECU 103 may receive the second unique signature from each of the zone master ECUs $107_1$ to $107_n$ of each of the predefined zones $105_1$ to $105_n$ to validate the security of the vehicle as a whole, as explained above in the present disclosure for performing the security validation based on the first unique signatures. In some embodiments, upon validating the security of the vehicle 101 based on the second unique signatures, the vehicle master ECU 103 may activate other functionalities associated with each of the plurality of secondary ECUs 113. In some embodiments, the other functionalities may be equivalent to non-critical functionalities of the vehicle 101. As an example, the other functionalities/non-critical functionalities of the vehicle 101 may include, but not limited to, infotainment system functionality, Heating, ventilation, and Air Conditioning (HVAC) control functionality, power window control functionality and the like.

Henceforth, the process of validating security of a vehicle is explained with the help of one or more examples for better understanding of the present disclosure. However, the one or more examples should not be considered as limitation of the present disclosure.

Figure 2B:
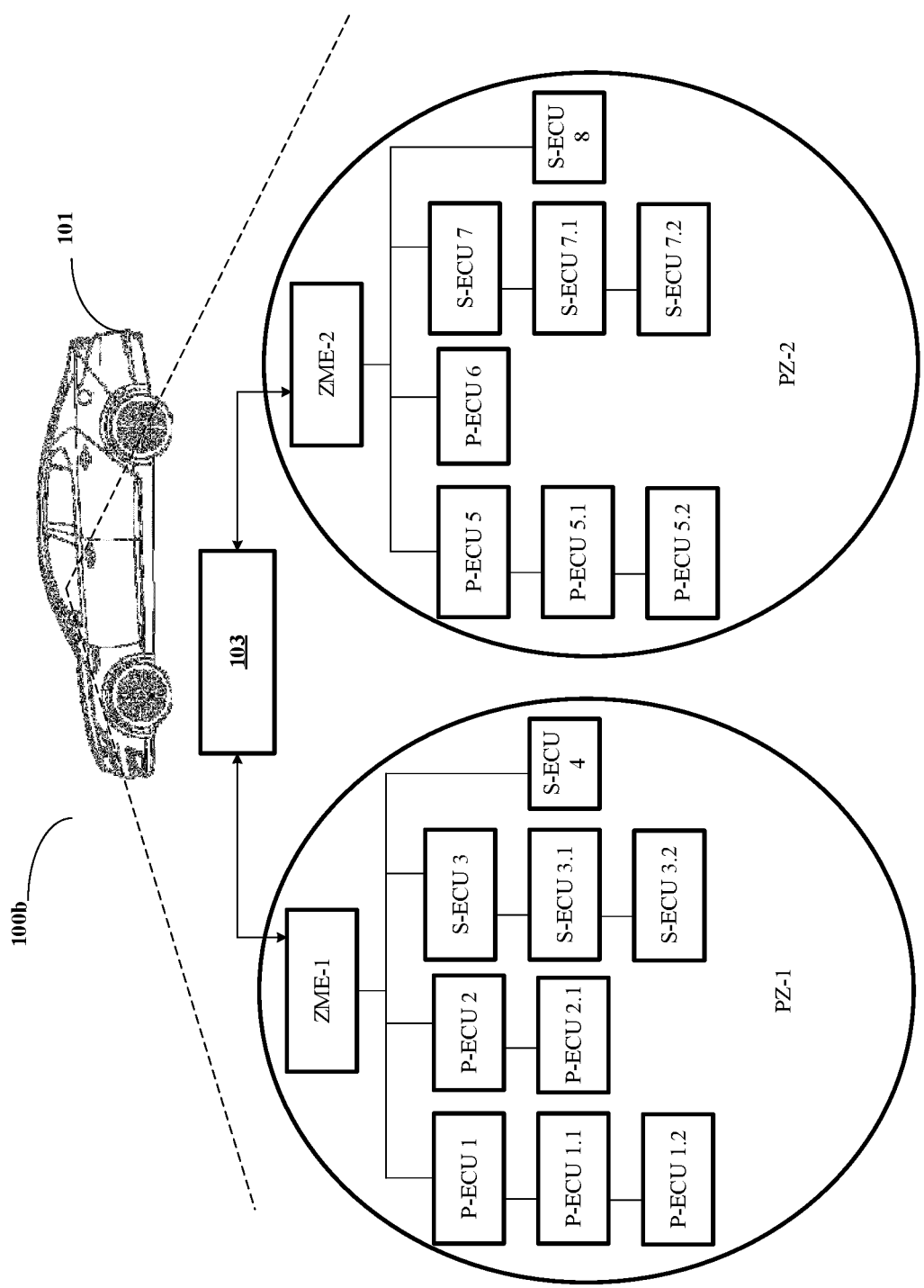
FIG. 2B illustrates an exemplary scenario for validating security of a vehicle in accordance with some embodiments of the present disclosure.

Consider an exemplary illustration as shown in the FIG. 2B. In this scenario, consider the arrangement of the in-vehicle network as indicated in the below Table 1.

TABLE 1

| Predefined Zone (PZ) number | Primary ECUs (P-ECU) in a PZ | Secondary ECUs (S-ECU) in a PZ | Zone Master ECU (ZME) number |
|---|---|---|---|
| PZ-1 | Total 5: P-ECU 1, P-ECU 1.1, P-ECU 1.2, P-ECU 2 and P-ECU 2.1 | Total 4: S-ECU 3, S-ECU 3.1, S-ECU 3.2, S-ECU 4 | ZME - 1 |
| PZ-2 | Total 4: P-ECU 5, P-ECU 5.1, P-ECU 5.2, and P-ECU 6 | Total 4: S-ECU 7, S-ECU 7.1, S-ECU 7.2, S-ECU 8 | ZME - 2 |

When the vehicle start-up phase occurs, there is a need for authentication of the ECUs of the vehicle 101. Faster the authentication/validation of the security of the vehicle 101, better is the user experience. Therefore, to ensure fast start-up, the present disclosure discloses a method of initially validating the plurality of primary ECUs (critical ECUs) 111 in each predefined zone 105, which are of utmost importance and then followed by validation of the secondary ECUs (non-critical ECUs) 113. In the present exemplary scenario, when there is an authentication requirement, parallelly, the following operations as shown in the Table 2 occur at PZ-1 and PZ-2, with respect to the primary ECUs.

VME 103 receives FUS-1 and FUS-2 from ZME-1 of PZ-1 and ZME-2 of PZ-2 respectively, and validates the security of the vehicle 101 based on the authenticity and validity of the primary/critical ECUs 111. When critical ECUs are attacked by the third party attackers, it may completely compromise the security of the vehicle 101 and handover control of the vehicle 101 to the third party attackers. Therefore, authenticating critical ECUs first not only enables in checking authenticity of most important ECUs of the vehicle 101 with full coverage, but also ensures high security. Moreover, the method disclosed in the present disclosure is not a sequential method of authenticating each ECU of a predefined zone one after the other, rather, the method disclosed in the present disclosure enables parallel verification in each of the predefined zones, and also with only predefined number (K−1) key shares received from the primary ECUs in each zone. Therefore, the present disclosure eliminates the need to wait for a response from each ECU to authenticate that ECU. Rather, the present disclosure enables using (K−1) key shares received from (K−1) number of primary ECUs in a predefined zone, and authenticates each of the primary ECU in that zone in one shot based on the unique signature computed using the (K−1) key shares. Upon validating security of the vehicle 101 based on the FUS-1 and FUS-2, the VME 103 activates secure/critical functionalities such as ABS functionality, airbag functionality, power train functionality and the like.

Thereafter, the ZME-1 and ZME-2 perform the same method for each of the plurality of secondary ECUs 113 in the predefined zones PZ-1 and PZ-2. In the present exemplary scenario, when there is an authentication requirement, parallelly, the following operations as shown in the Table 3 occur at PZ-1 and PZ-2, with respect to the secondary ECUs.

TABLE 2

| At PZ-1 | At PZ-2 |
|---|---|
| ZME-1 requests P-ECUs: P-ECU 1, P-ECU 1.1, P-ECU 1.2, P-ECU 2 and P-ECU 2.1 to provide their respective pre-allocated signed unique cryptographic key shares. ZME-1 receives pre-allocated signed unique cryptographic key shares from P-ECUs in the order of P-ECU 1, P-ECU 1.1, P-ECU 2, P-ECU 1.2 and P-ECU 2.1. Key shares: y1, y1.1, y2, y1.2, y2.1 respectively. Consider ZME-1 follows First Come First Serve (FCFS) technique to select (K-1) key shares. For example, let (K-1) key shares be equal to 3. Therefore, the (K-1) key shares selected by ZME-1 are y1, y1.1, and y2, belonging to P-ECU 1, P-ECU 1.1 and P-ECU 2, respectively ZME-1 computes first unique signature based on Equation 2 as shown below: First Unique Signature (FUS-1): Sig(P-ECU 1 + P-ECU 1.1 + P-ECU 2) = $m^{(y1+y1.1+y2)}$ mod N ZME-1 verifies validity of FUS-1 and if successful, shares FUS-1 to Vehicle Master ECU (VME) 103 | ZME-2 requests P-ECUs: P-ECU 5, P-ECU 5.1, P-ECU 5.2, and P-ECU 6 to provide their respective pre-allocated signed unique cryptographic key shares. ZME-2 receives pre-allocated signed unique cryptographic key shares from P-ECUs in the order of P-ECU 5, P-ECU 5.1, P-ECU 5.2 and P-ECU 6. Key shares: y5, y5.1, y5.2, y6 respectively. Consider ZME-2 follows First Come First Serve (FCFS) technique to select (K-1) key shares. For example, let (K-1) key shares be equal to 3. Therefore, the (K-1) key shares selected by ZME-2 are y5, y5.1, and y5.2, belonging to P-ECU 5, P-ECU 5.1 and P-ECU 5.2, respectively ZME-2 computes first unique signature based on Equation 2 as shown below: First Unique Signature (FUS-2): Sig(P-ECU 5 + P-ECU 5.1 + P-ECU 5.2) = $m^{(y5+y5.1+y5.2)}$ mod N ZME-2 verifies validity of FUS-2 and if successful, shares FUS-2 to Vehicle Master ECU (VME) 103 |

TABLE 3

| At PZ-1 | At PZ-2 |
| --- | --- |
| ZME-1 requests S-ECUs: S-ECU 3, S-ECU 3.1, S-ECU 3.2 and S-ECU 4 to provide their respective pre-allocated signed unique cryptographic key shares. ZME-1 receives pre-allocated signed unique cryptographic key shares from S-ECUs in the order of S-ECU 4, S-ECU 3.1, S-ECU 3 and S-ECU 3.2. Key shares: y4, y3.1, y3, y3.2, respectively. Consider ZME-1 follows First Come First Serve (FCFS) technique to select (K-1) key shares. For example, let (K-1) key shares be equal to 3. Therefore, the (K-1) key shares selected by ZME-1 are y4, y3.1 and y3, belonging to S-ECU 4, S-ECU 3.1 and S-ECU 3, respectively ZME-1 computes second unique signature based on Equation 2 as shown below: Second Unique Signature (SUS-1): Sig(S-ECU 4 + S-ECU 3.1 + S-ECU 3) = $m^{(y4+y3.1+y3)}$ mod N ZME-1 verifies validity of SUS-1 and if successful, shares SUS-1 to Vehicle Master ECU (VME) 103 | ZME-2 requests S-ECUs: S-ECU 7, S-ECU 7.1, S-ECU 7.2, and S-ECU 8 to provide their respective pre-allocated signed unique cryptographic key shares. ZME-2 receives pre-allocated signed unique cryptographic key shares from P-ECUs in the order of S-ECU 7, S-ECU 7.1, S-ECU 7.2 and S-ECU 8. Key shares: y7, y7.1, y7.2, y8 respectively. Consider ZME-2 follows First Come First Serve (FCFS) technique to select (K-1) key shares. For example, let (K-1) key shares be equal to 3. Therefore, the (K-1) key shares selected by ZME-2 are y7, y7.1, and y7.2, belonging to S-ECU 7, S-ECU 7.1 and S-ECU 7.2, respectively ZME-2 computes first unique signature based on Equation 2 as shown below: Second Unique Signature (SUS-2): Sig(S-ECU 7 + S-ECU 7.1 + S-ECU 7.2) = $m^{(y7+y7.1+y7.2)}$ mod N ZME-2 verifies validity of SUS-2 and if successful, shares SUS-2 to Vehicle Master ECU (VME) 103 |

VME 103 receives SUS-1 and SUS-2 from ZME-1 of PZ-1 and ZME-2 of PZ-2 respectively, and validates the security of the vehicle 101 based on the authenticity and validity of the secondary/non-critical ECUs 111. Since, secondary ECUs are non-critical in nature, validating the secondary ECUs even after the start-up phase, after the validation of primary ECUs (required for start-up itself), may not harm the in-vehicle network. Moreover, performing validation of the secondary/non-critical ECUs at a later stage after start-up, may enhance the speed of validation of primary/critical ECUs at the start-up phase, eliminates unnecessary delays during the start-up phase, enhances coverage of the primary/critical ECUs at the start-up phase, and also enhances user experience due to faster validation of critical security health check leading to fast start-up. Upon validating security of the vehicle 101 based on the SUS-1 and SUS-2, the VME 103 activates secure/critical functionalities such as infotainment system functionality, Heating, ventilation, and Air Conditioning (HVAC) control functionality, power window control functionality and the like.

Figure 3:
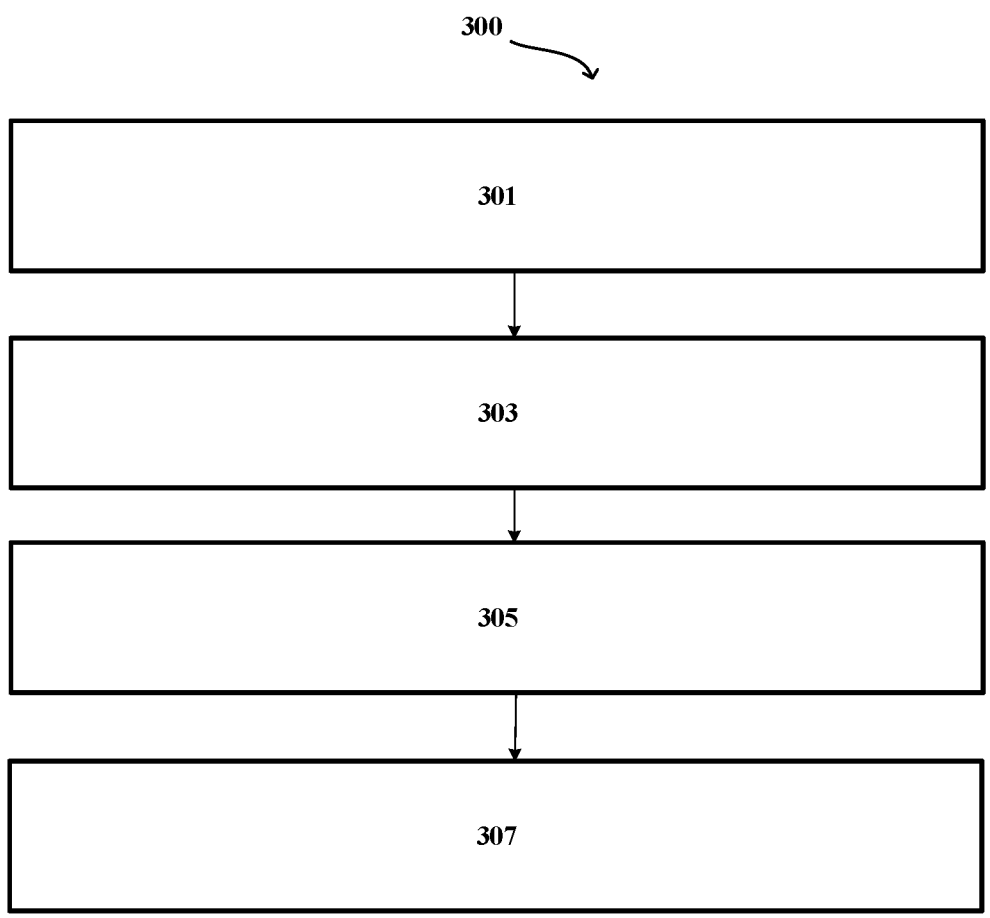
FIG. 3 shows a flowchart illustrating a method of validating security of a vehicle in accordance with some embodiments of the present disclosure.

FIG. 3 shows a flowchart illustrating a method of validating security of a vehicle in accordance with some embodiments of the present disclosure.

As illustrated in FIG. 3, the method 300 includes one or more blocks illustrating a method validating security of a vehicle 101. The method 300 may be described in the general context of computer executable instructions. Generally, computer executable instructions can include routines, programs, objects, components, data structures, procedures, modules, and functions, which perform functions or implement abstract data types.

The order in which the method 300 is described is not intended to be construed as a limitation, and any number of the described method blocks can be combined in any order to implement the method 300. Additionally, individual blocks may be deleted from the methods without departing from the spirit and scope of the subject matter described herein. Furthermore, the method 300 can be implemented in any suitable hardware, software, firmware, or combination thereof.

At block 301, the method 300 may include requesting, by a processor 115 of an authentication system $109_1$ integrated in a zone master Electronic Control Unit (ECU) $107_1$ of one of a predefined zones $105_1$, pre-allocated signed unique cryptographic key shares from each of a plurality of primary ECUs 111A associated with the zone master ECU $107_1$. In some embodiments, the processor 115 may request for the pre-allocated signed unique cryptographic key shares from each of the plurality of primary ECUs 111A, when there is an authentication requirement in an in-vehicle network. In some embodiments, the pre-allocated signed unique cryptographic key shares received from the plurality of primary ECUs 111A, are encrypted using a random number or nonce.

At block 303, the method 300 may include computing, by the processor 115, a first unique signature of the predefined zone using a predefined number (K−1) of the pre-allocated signed unique cryptographic key shares received from the plurality of primary ECUs 111A. In some embodiments, the predefined number (K−1) may be minimum number of the pre-allocated signed unique cryptographic key shares required to compute the first unique signature and a second unique signature. In some embodiments, the predefined number (K−1) of the unique cryptographic key shares are selected based on one of a First Come First Serve (FCFS) technique, a random selection technique, or a rule-based technique.

At block 305, the method 300 may include, verifying, by the processor 115, validity of the computed first unique signature using a public key, to authenticate each of the plurality of primary ECUs 111A in the predefined zone $105_1$. In some embodiments, the public key for each predefined zone may be obtained from a storage unit associated with the corresponding zone master ECU $107_1$, for verifying the validity of the computed first unique signature and a second unique signature.

At block 307, the method 300 may include providing, by the processor 115, the verified first unique signature to a vehicle master ECU 103 associated with the zone master ECU $107_1$ to $107_n$ of each predefined zone $105_1$ to $105_n$, to enable the vehicle master ECU 103 to activate safety functionalities associated with each of the plurality of primary ECUs 111 of each predefined zone $105_1$ to $105_n$.

In some embodiments, the processor 115 may repeat the steps at block 301-block 307 for the plurality of secondary ECUs 113A associated with the zone master ECU $107_1$ in the predefined zone $105_1$, after the vehicle master ECU 103 has validated security of the vehicle 101 based on the plurality of primary ECUs 111. In some embodiments, while performing the steps at block 301-block 307 for the plurality of secondary ECUs 113A, the second unique signature may be computed for verification and providing to the vehicle master ECU 103 for validating security of the vehicle 101 based on the plurality of secondary ECUs 113 associated with each zone master ECU $107_1$ to $107_n$ of each predefined zone $105_1$ to $105_n$.

Figure 4:
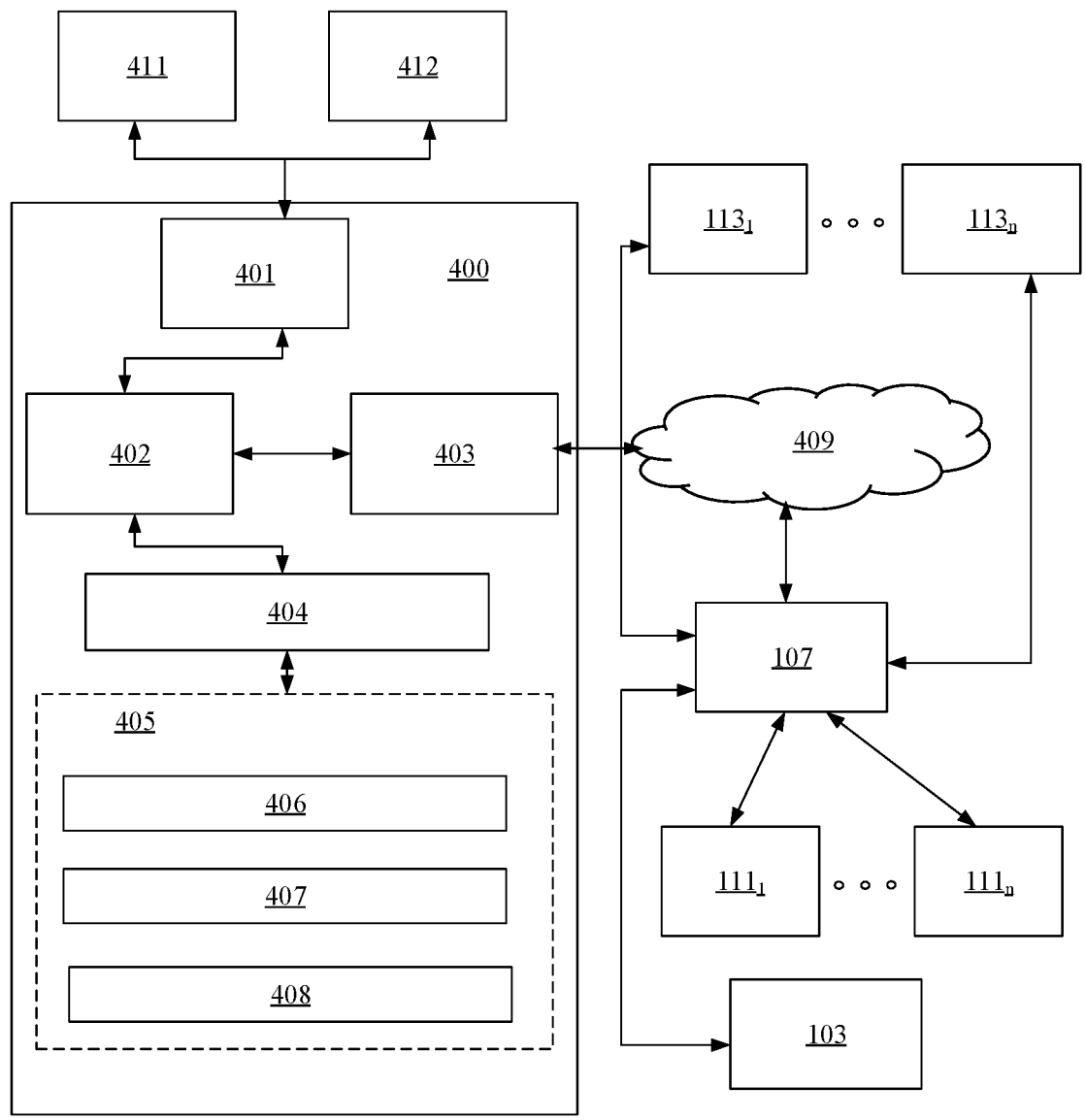
FIG. 4 is a block diagram of an exemplary computer system for implementing embodiments consistent with the present disclosure.

FIG. 4 is a block diagram of an exemplary computer system for implementing embodiments consistent with the present disclosure.

In some embodiments, FIG. 4 illustrates a block diagram of an exemplary computer system 400 for implementing embodiments consistent with the present invention. In some embodiments, the computer system 400 can be an authentication system 109 associated with an zone master Electronic Control Unit (ECU) 107 for validating security of a vehicle 101, as shown in the FIG. 4. In some other embodiments, the computer system 400 can be an vehicle master ECU 103 associated with each of the zone master ECUs $107_1$ to $107_n$, for validating security of the vehicle 101. The computer system 400 may include a central processing unit ("CPU" or "processor") 402. The processor 402 may include at least one data processor for executing program components for executing user or system-generated business processes. A user may include a person, a person using a device such as those included in this invention, or such a device itself. The processor 402 may include specialized processing units such as integrated system (bus) controllers, memory management control units, floating point units, graphics processing units, digital signal processing units, etc.

The processor 402 may be disposed in communication with input devices 411 and output devices 412 via I/O interface 401. The I/O interface 401 may employ communication protocols/methods such as, without limitation, audio, analog, digital, stereo, IEEE-1394, serial bus, Universal Serial Bus (USB), infrared, PS/2, BNC, coaxial, component, composite, Digital Visual Interface (DVI), high-definition multimedia interface (HDMI), Radio Frequency (RF) antennas, S-Video, Video Graphics Array (VGA), IEEE 802.n/b/g/n/x, Bluetooth, cellular (e.g., Code-Division Multiple Access (CDMA), High-Speed Packet Access (HSPA+), Global System For Mobile Communications (GSM), Long-Term Evolution (LTE), WiMax, or the like), etc.

Using the I/O interface 401, computer system 400 may communicate with input devices 411 and output devices 412.

In some embodiments, the processor 402 may be disposed in communication with a communication network 409 via a network interface 403. The network interface 403 may communicate with the communication network 409. The network interface 403 may employ connection protocols including, without limitation, direct connect, Ethernet (e.g., twisted pair 10/100/1000 Base T), Transmission Control Protocol/Internet Protocol (TCP/IP), token ring, IEEE 802.11a/b/g/n/x, etc. Using the network interface 403 and the communication network 409, the computer system 400 may communicate with a plurality of zone master ECUs 107 ($107_1$ up to $107_n$), which in turn communicates with the vehicle master ECU 103 and with a plurality of primary ECUs 111 ($111_1$ up to $111_n$) and a plurality of secondary ECUs 113 ($113_1$ up to $113_n$), via internet or non-internet or non-IP based communication such as Universal Serial Bus (USB), Bluetooth and the like. The communication network 409 can be implemented as one of the different types of networks, such as intranet or Local Area Network (LAN), Closed Area Network (CAN) and such within the autonomous vehicle. The communication network 409 may either be a dedicated network or a shared network, which represents an association of the different types of networks that use a variety of protocols, for example, Hypertext Transfer Protocol (HTTP), CAN Protocol, Transmission Control Protocol/Internet Protocol (TCP/IP), Wireless Application Protocol (WAP), etc., to communicate with each other. Further, the communication network 409 may include a variety of network devices, including routers, bridges, servers, computing devices, storage devices, etc. In some embodiments, the processor 402 may be disposed in communication with a memory 405 (e.g., RAM, ROM, etc. not shown in FIG. 4) via a storage interface 404. The storage interface 404 may connect to memory 405 including, without limitation, memory drives, removable disc drives, etc., employing connection protocols such as Serial Advanced Technology Attachment (SATA), Integrated Drive Electronics (IDE), IEEE-1394, Universal Serial Bus (USB), fibre channel, Small Computer Systems Interface (SCSI), etc. The memory drives may further include a drum, magnetic disc drive, magneto-optical drive, optical drive, Redundant Array of Independent Discs (RAID), solid-state memory devices, solid-state drives, etc.

The memory 405 may store a collection of program or database components, including, without limitation, a user interface 406, an operating system 407, a web browser 408 etc. In some embodiments, the computer system 400 may store user/application data, such as the data, variables, records, etc. as described in this invention. Such databases may be implemented as fault-tolerant, relational, scalable, secure databases such as Oracle or Sybase.

The operating system 407 may facilitate resource management and operation of the computer system 400. Examples of operating systems 407 include, without limitation, APPLE® MACINTOSH® OS X®, UNIX®, UNIX-like system distributions (E.G., BERKELEY SOFTWARE DISTRIBUTION® (BSD), FREEBSD®, NETBSD®, OPENBSD, etc.), LINUX® DISTRIBUTIONS (E.G., RED HAT®, UBUNTU®, KUBUNTU®, etc.), IBM® OS/2®), MICROSOFT® WINDOWS® (XP®, VISTA®/7/8, 10 etc.), APPLE® IOS®, GOOGLE™ ANDROID™, BLACKBERRY® OS, or the like. The User interface 406 may facilitate display, execution, interaction, manipulation, or operation of program components through textual or graphical facilities. For example, user interfaces 406 may provide computer interaction interface elements on a display system operatively connected to the computer system 400, such as cursors, icons, checkboxes, menus, scrollers, windows, widgets, etc. Graphical User Interfaces (GUIs) may be employed, including, without limitation, Apple® Macintosh® operating systems' Aqua®, IBM® OS/2®, Microsoft® Windows® (e.g., Aero, Metro, etc.), web interface libraries (e.g., ActiveX®, Java®, Javascript®, AJAX, HTML, Adobe® Flash®, etc.), or the like.

In some embodiments, the computer system 400 may implement the web browser 408 stored program components. The web browser 408 may be a hypertext viewing application, such as MICROSOFT® INTERNET EXPLORER®, GOOGLE™ CHROME™, MOZILLA® FIREFOX®, APPLE® SAFARI®, etc. Secure web browsing may be provided using Secure Hypertext Transport Protocol (HTTPS), Secure Sockets Layer (SSL), Transport Layer Security (TLS), etc. Web browsers 408 may utilize facilities such as AJAX, DHTML, ADOBE® FLASH®, JAVASCRIPT®, JAVA®, Application Programming Interfaces (APIs), etc. In some embodiments, the computer system 400 may implement a mail server stored program component. The mail server may be an Internet mail server such as Microsoft Exchange, or the like. The mail server may utilize facilities such as Active Server Pages (ASP), ACTIVEX®, ANSI® C++/C #, MICROSOFT®, .NET, CGI SCRIPTS, JAVA®, JAVASCRIPT®, PERL®, PHP, PYTHON®, WEBOBJECTS®, etc. The mail server may utilize communication protocols such as Internet Message Access Protocol (IMAP), Messaging Application Programming Interface (MAPI), MICROSOFT® exchange, Post Office Protocol (POP), Simple Mail Transfer Protocol (SMTP), or the like. In some embodiments, the computer system 400 may implement a mail client stored program component. The mail client may be a mail viewing application, such as APPLE® MAIL, MICROSOFT® ENTOURAGE®, MICROSOFT® OUTLOOK®, MOZILLA® THUNDERBIRD®, etc.

Furthermore, one or more computer-readable storage media may be utilized in implementing embodiments consistent with the present invention. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., non-transitory. Examples include Random Access Memory (RAM), Read-Only Memory (ROM), volatile memory, non-volatile memory, hard drives, Compact Disc (CD) ROMs, Digital Video Disc (DVDs), flash drives, disks, and any other known physical storage media.

Overall, the present disclosure provides a feasible security verification for the critical ECUs in the vehicle during start-up phase. The present disclosure ensures the authenticity of critical ECUs and prevent them from being compromised by attackers. Therefore, the present disclosure:
- Achieves faster checking of authenticity and start-up, due to use of single step security verification for a group of ECUs instead of numbers of security verifications for each ECUs.
- Reduces the security verification timing and increases the user experience level.
- Ensures authenticity of critical ECUs during start-up phase within the balanced performance and cost factors.

A description of an embodiment with several components in communication with each other does not imply that all such components are required. On the contrary, a variety of optional components are described to illustrate the wide variety of possible embodiments of the invention. When a single device or article is described herein, it will be apparent that more than one device/article (whether or not they cooperate) may be used in place of a single device/article. Similarly, where more than one device or article is described herein (whether or not they cooperate), it will be apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the invention need not include the device itself.

The specification has described a method and a system for validating security of a vehicle. The illustrated steps are set out to explain the exemplary embodiments shown, and it should be anticipated that on-going technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments. Also, the words "comprising," "having," "containing," and "including," and other similar forms are intended to be equivalent in meaning and be open-ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based here on. Accordingly, the embodiments of the present invention are intended to be illustrative, but not limiting, of the scope of the invention, which is set forth in the following claims.

REFERRAL NUMERALS

| Reference Number | Description |
| --- | --- |
| 100 | Architecture |
| 101 | Vehicle |
| 103 | Vehicle master ECU |
| 105 | Predefined zones |
| 107 | Zone master ECU |
| 109 | Authentication system |
| 111 | Plurality of primary ECUs |
| 113 | Plurality of secondary ECUs |
| 115 | Processor |
| 117 | I/O interface |
| 119 | Memory |
| 203 | Data |
| 205 | Modules |
| 207 | Key share data |
| 209 | Signature data |

-continued

| Reference Number | Description |
| --- | --- |
| 211 | Other data |
| 221 | Signature computing module |
| 223 | Receiving module |
| 225 | Signature verifying module |
| 227 | Transmitting module |
| 229 | Other modules |
| 400 | Exemplary computer system |
| 401 | I/O Interface of the exemplary computer system |
| 402 | Processor of the exemplary computer system |
| 403 | Network interface |
| 404 | Storage interface |
| 405 | Memory of the exemplary computer system |
| 406 | User interface |
| 407 | Operating system |
| 408 | Web browser |
| 409 | Communication network |
| 411 | Input devices |
| 412 | Output devices |

The invention claimed is:

1. A method of validating security of a vehicle, wherein an in-vehicle network of the vehicle is partitioned into predefined zones and each of the predefined zones is provided with a plurality of ECUs that are classified into at least one of primary ECUs or secondary ECUs, further wherein each predefined zone comprises a zone master ECU associated with each of the plurality of ECUs of the corresponding predefined zone, the method comprising:
   requesting, by an authentication system integrated in a zone master ECU of a predefined zone, pre-allocated signed unique cryptographic key shares from a plurality of primary ECUs associated with the zone master ECU, when there is an authentication requirement in an in-vehicle network;
   computing, by the authentication system, a first unique signature of the predefined zone using a predefined number (K-1) of the pre-allocated signed unique cryptographic key shares received from the plurality of primary ECUs;
   verifying, by the authentication system, validity of the computed first unique signature using a public key, to authenticate each of the plurality of primary ECUs in the predefined zone; and
   providing, by the authentication system, the verified first unique signature to a vehicle master ECU associated with the zone master ECU of each predefined zone, to enable the vehicle master ECU to activate safety functionalities associated with each of the plurality of primary ECUs of each predefined zone.

2. The method as claimed in claim 1, further comprises:
   requesting, by the authentication system, pre-allocated signed unique cryptographic key shares from each of a plurality of secondary ECUs associated with the zone master ECU, upon validating the plurality of primary ECUs;
   computing, by the authentication system, a second unique signature of the predefined zone using a predefined number of the pre-allocated signed unique cryptographic key shares received from the plurality of secondary ECUs;
   verifying, by the authentication system, validity of the computed second unique signature using the public key, to authenticate each of the plurality of secondary ECUs in the predefined zone; and
   providing, by the authentication system, the verified second unique signature to the vehicle master ECU associated with the zone master ECU of each predefined zone, to enable the vehicle master ECU to activate other functionalities associated with each of the plurality of secondary ECUs of each predefined zone.

3. The method as claimed in claim 1, wherein the predefined number (K-1) of the unique cryptographic key shares are selected based on one of a First Come First Serve (FCFS) technique, a random selection technique, or a rule-based technique.

4. The method as claimed in claim 1 comprises obtaining the public key for each predefined zone from a storage unit associated with the corresponding zone master ECU, for verifying the validity of the computed first unique signature and a second unique signature.

5. The method as claimed in claim 1 comprises encrypting the pre-allocated signed unique cryptographic key shares received from the plurality of primary ECUs, using a random number.

6. The method as claimed in claim 1 comprises signing each of the pre-allocated unique cryptographic key shares using an equation, $$\text{Sig}(ECUi) = m^{yi} \bmod N$$

wherein, "i" is an integer (1, 2 ... n), "m" is a preconfigured value, "y" is the unique cryptographic key share, "N" is the public key, and mod N is a modulo of the public key determined using a predefined modular arithmetic technique.

7. The method as claimed in claim 1 comprises computing the unique first signature and a unique second signature using an equation, $$\text{Sig}(ECU1 + ECU2 +, \ldots, +ECUk-1) = m^S \bmod N$$

wherein Sig (ECU1+ECU2+, ..., +ECUk-1) indicates signed unique cryptographic key shares received from at least one of the plurality of primary ECUs or the plurality of secondary ECUs, "m" is a preconfigured value, "S" is equal to (y1+y2, ..., +yk-1), wherein "y" is the unique cryptographic key share, "K-1" indicates predefined number of unique cryptographic key shares required for computing the unique first signature or the unique second signature, "N" is the public key, and mod N is a modulo of the public key determined using a predefined modular arithmetic technique.

8. An authentication system for validating security of a vehicle, wherein an in-vehicle network of the vehicle is partitioned into predefined zones and each of the predefined zones is provided with a plurality of ECUs that are classified into at least one of primary ECUs or secondary ECUs, further wherein each predefined zone comprises a zone master ECU associated with each of the plurality of ECUs of the corresponding predefined zone, the authentication system comprising:
   a processor; and
   a memory communicatively coupled to the processor, wherein the memory stores the processor instructions, which, on execution, causes the processor to:
   request pre-allocated signed unique cryptographic key shares from a plurality of primary ECUs associated with the zone master ECU, when there is an authentication requirement in an in-vehicle network;
   compute a first unique signature of the predefined zone using a predefined number (K-1) of the pre-allocated signed unique cryptographic key shares received from the plurality of primary ECUs;

verify validity of the computed first unique signature using a public key, to authenticate each of the plurality of primary ECUs in the predefined zone; and provide the verified first unique signature to a vehicle master ECU associated with the zone master ECU of each predefined zone, to enable the vehicle master ECU to activate safety functionalities associated with each of the plurality of primary ECUs of each predefined zone.

9. The authentication system as claimed in claim 8, wherein the processor is further configured to:

request pre-allocated signed unique cryptographic key shares from each of a plurality of secondary ECUs associated with the zone master ECU, upon validating the plurality of primary ECUs;

compute a second unique signature of the predefined zone using a predefined number (K−1) of the pre-allocated signed unique cryptographic key shares received from the plurality of secondary ECUs;

verify validity of the computed second unique signature using the public key, to authenticate each of the plurality of secondary ECUs in the predefined zone; and provide the verified second unique signature to the vehicle master ECU associated with the zone master ECU of each predefined zone, to enable the vehicle master ECU to activate other functionalities associated with each of the plurality of secondary ECUs of each predefined zone.

10. The authentication system as claimed in claim 8, wherein the processor selects the predefined number (K−1) of the unique cryptographic key shares based on one of a First Come First Serve (FCFS) technique, a random selection technique, or a rule-based technique.

11. The authentication system as claimed in claim 8, wherein the processor obtains the public key for each predefined zone from a storage unit associated with the corresponding zone master ECU, for verifying the validity of the computed first unique signature and a second unique signature.

12. The authentication system as claimed in claim 8, wherein the pre-allocated signed unique cryptographic key shares received from the plurality of primary ECUs, are encrypted using a random number.

13. The authentication system as claimed in claim 8, wherein the processor signs each of the pre-allocated unique cryptographic key shares using an equation, $$\text{Sig}(\text{ECU}i) = m^{yi} \bmod N$$

wherein, "i" is an integer (1, 2 ... n), "m" is a preconfigured value, "y" is the unique cryptographic key share, "N" is a public key, and mod N is a modulo of the public key determined using a predefined modular arithmetic technique.

14. The authentication system as claimed in claim 8, wherein the processor computes the unique first signature and a unique second signature using an equation, $$\text{Sig}(\text{ECU}1 + \text{ECU}2 +, \ldots, +\text{ECU}k-1) = m^{S} \bmod N$$

wherein Sig(ECU1+ECU2+, ..., +ECUk−1) indicates signed unique cryptographic key shares received from at least one of the plurality of primary ECUs (111) or the plurality of secondary ECUs (113), "m" is a pre-configured value, "S" is equal to (y1+y2, ..., +yk−1), wherein "y" is the unique cryptographic key share, "K−1" indicates predefined number of unique cryptographic key shares required for computing the unique first signature or the unique second signature, "N" is a public key, and mod N is a modulo of the public key determined using a predefined modular arithmetic technique.

* * * * *